April 4, 1950  G. DEAKIN  2,502,440
VARIABLE IMPULSE TRANSMITTER
Filed Jan. 21, 1947  11 Sheets-Sheet 2

INVENTOR.
GERALD DEAKIN

BY
ATTORNEYS

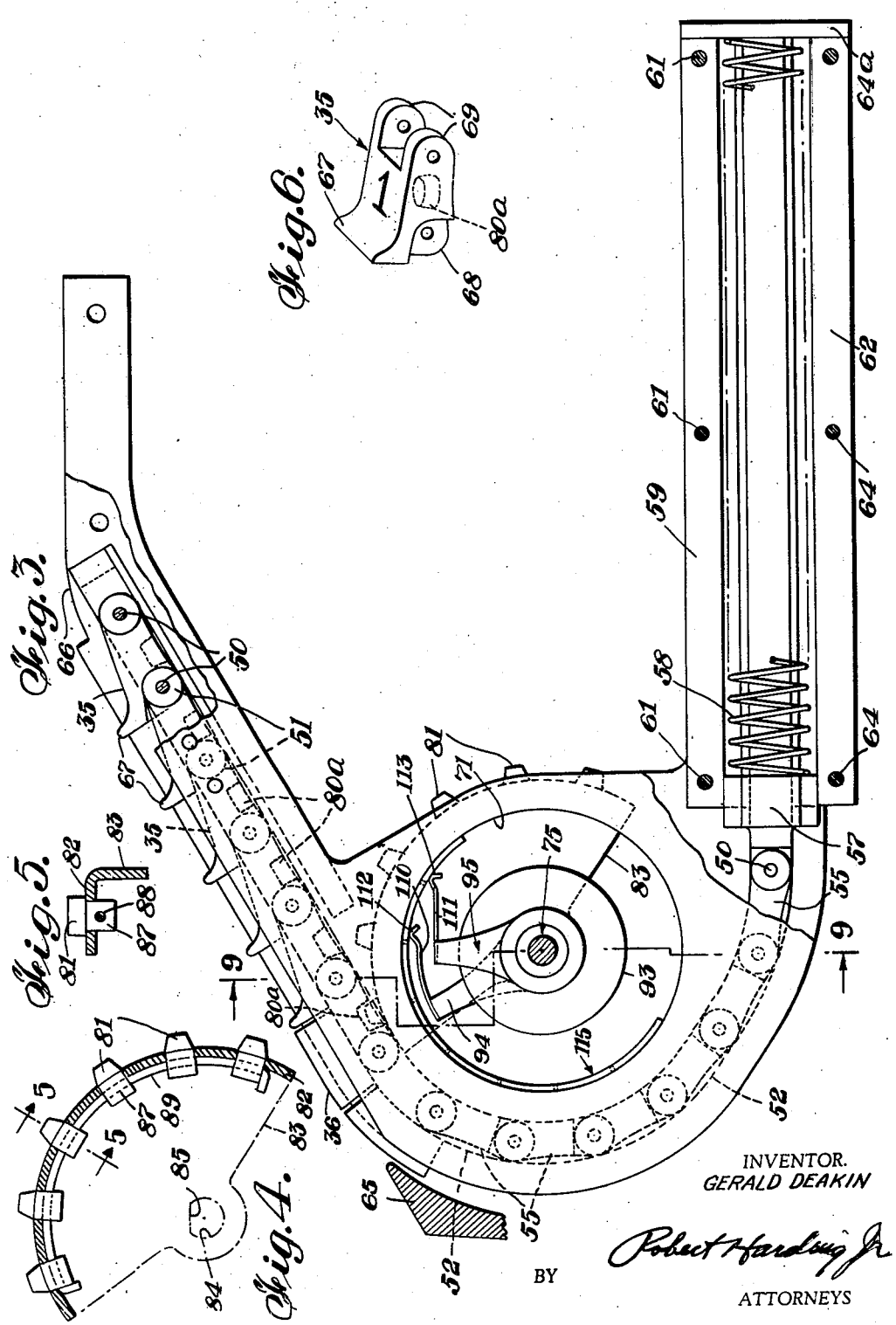

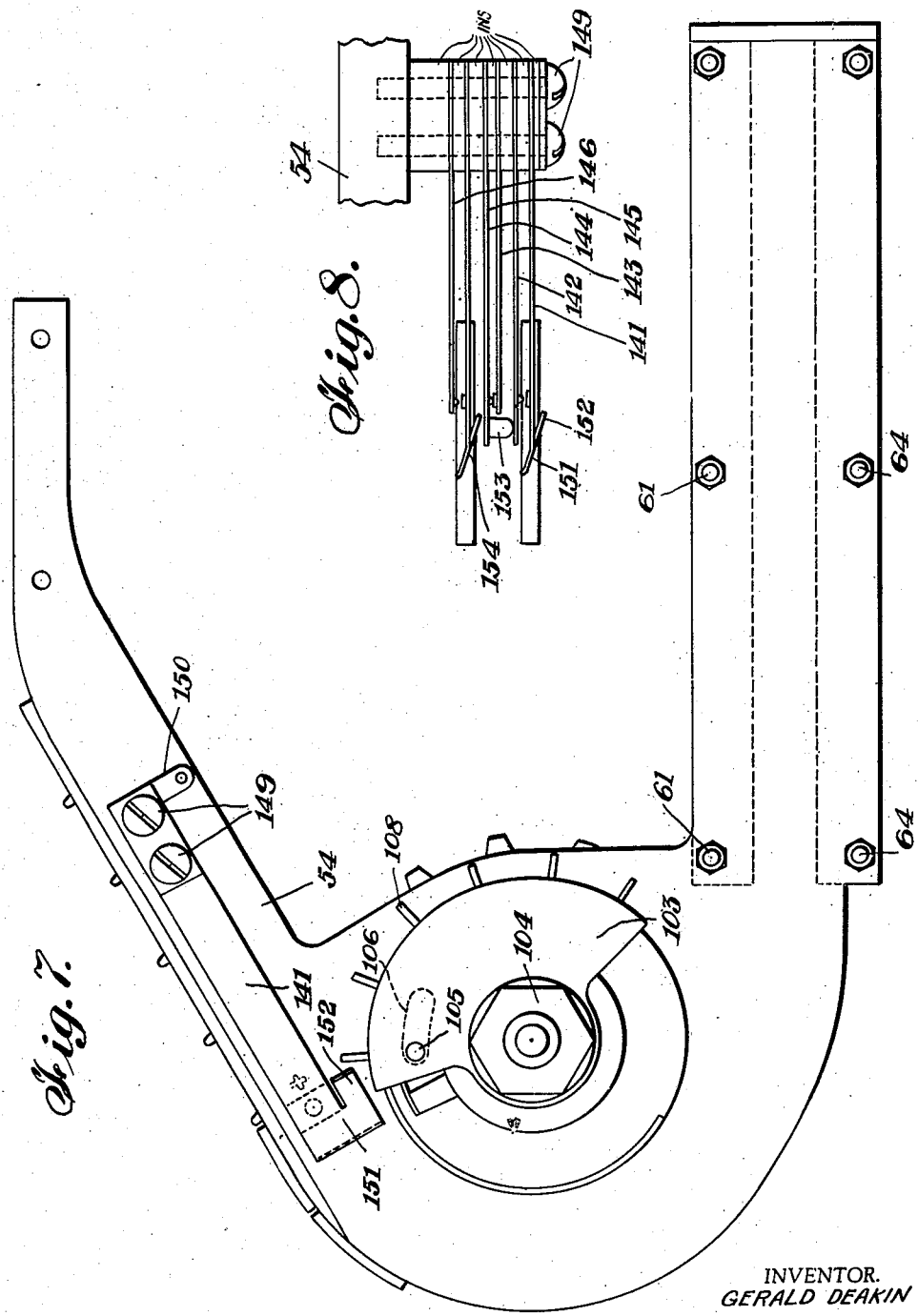

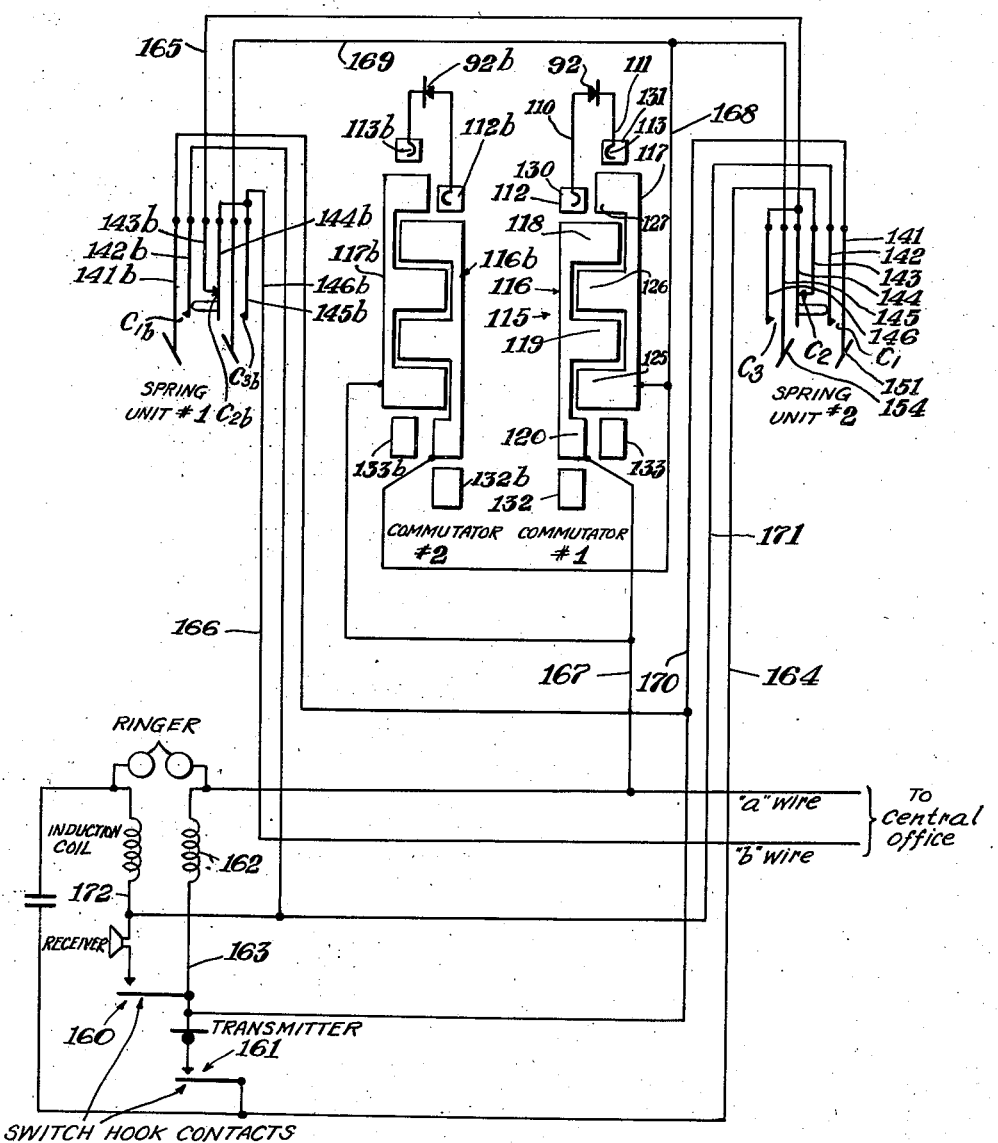

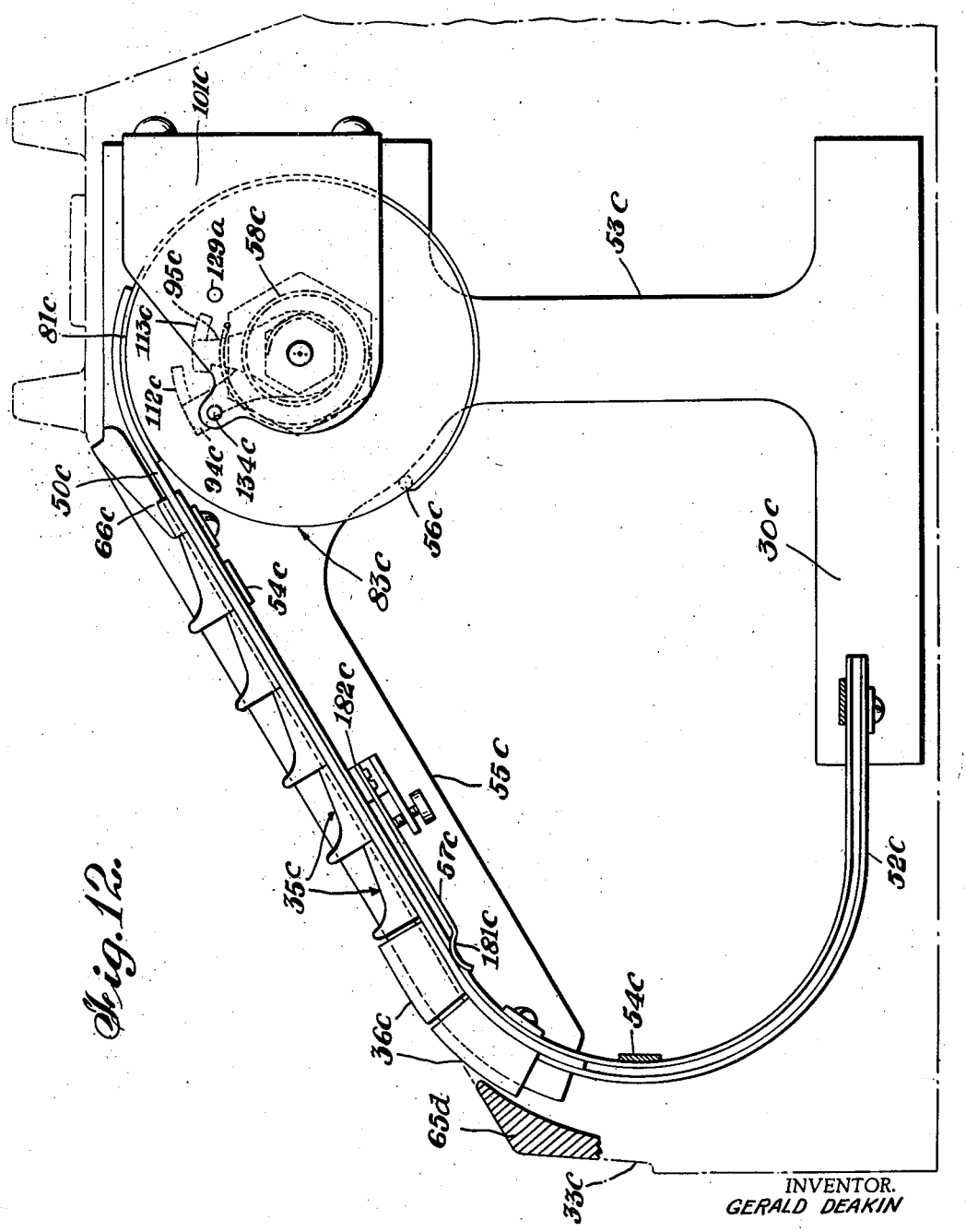

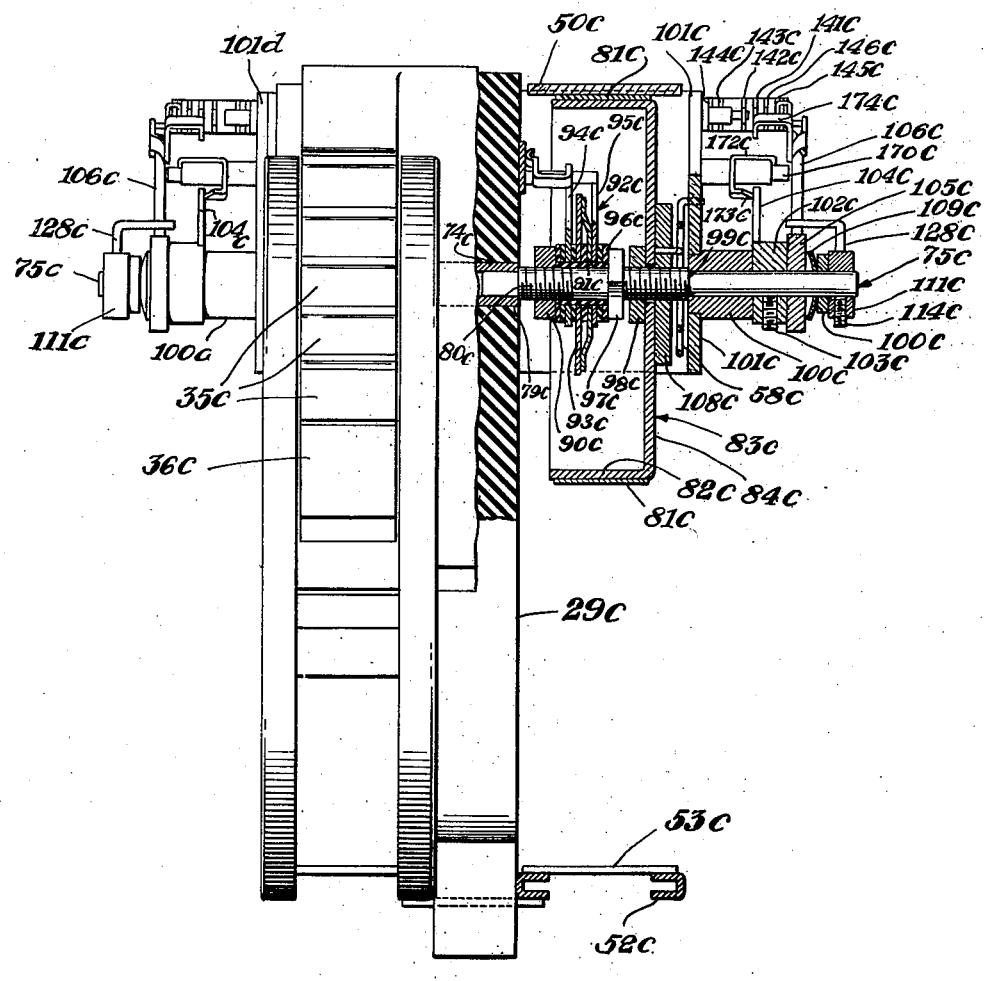

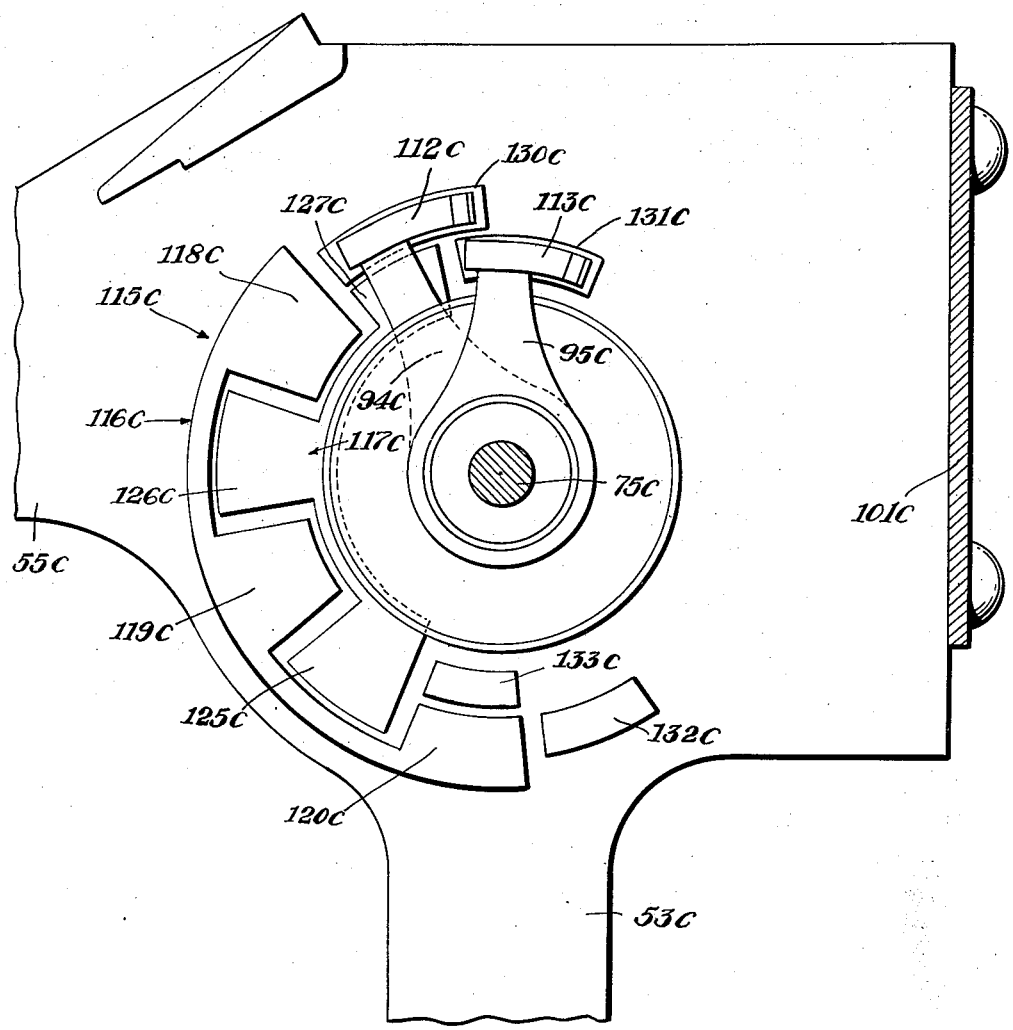

April 4, 1950 G. DEAKIN 2,502,440
VARIABLE IMPULSE TRANSMITTER
Filed Jan. 21, 1947 11 Sheets-Sheet 10

INVENTOR.
GERALD DEAKIN

BY Robert Harding Jr.
ATTORNEYS

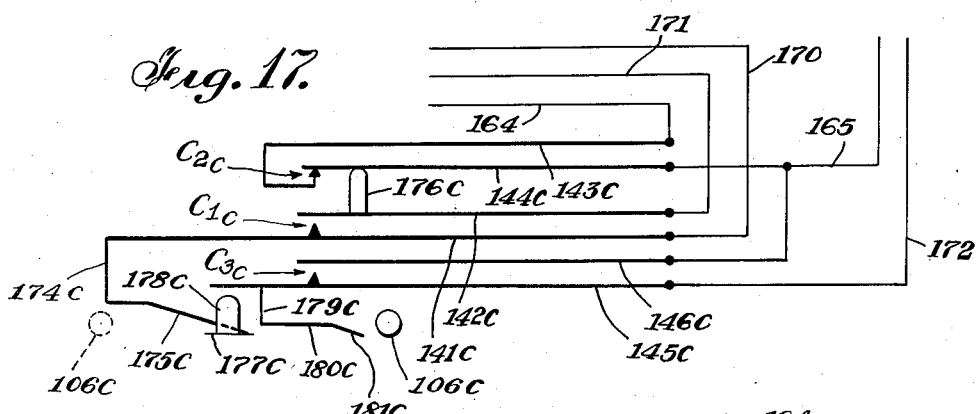
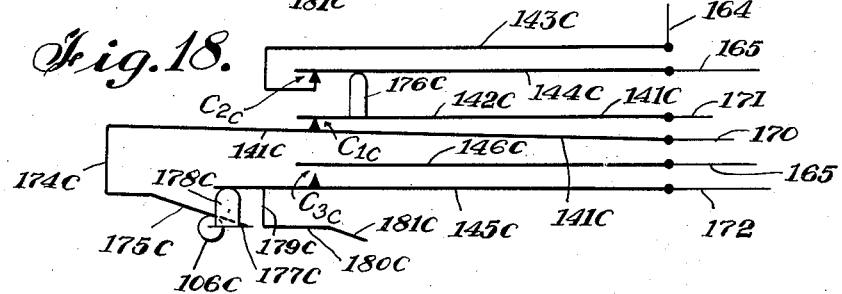
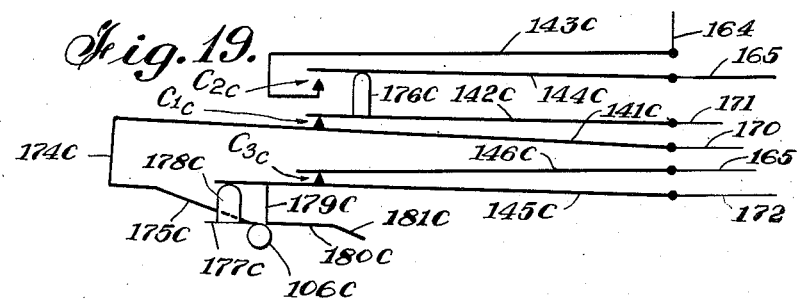
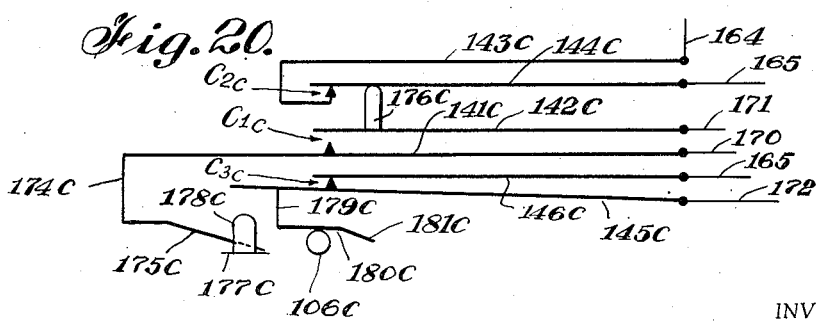

Patented Apr. 4, 1950

2,502,440

UNITED STATES PATENT OFFICE 2,502,440

VARIABLE IMPULSE TRANSMITTER

Gerald Deakin, New York, N. Y., assignor to International Standard Electric Corporation, New York, N. Y., a corporation of Delaware Application January 21, 1947, Serial No. 723,446

22 Claims. (Cl. 177—380)

1

This invention relates to new and useful improvements in electrical signalling and switching systems and more particularly to improved pulse sending devices for use in telecommunication switching systems such as automatic and semi-automatic telephone exchanges.

An important object of the invention is to provide novel and advantageous means for increasing the speed and ease with which the setting of switching means such as that for a numerical selector, may be effected.

As in my co-pending application Serial No. 527,921, filed March 24, 1944, now Patent No. 2,433,347 issued December 30, 1947, a total of ten different numerical settings are selectively controlled by sending positive and negative pulse combinations consisting of less than ten pulses. Each pulse combination consists of one to a maximum of five pulses and these pulse combinations are divided into two groups: each combination of one group beginning with a positive pulse and each combination of the other group beginning with a negative pulse. One of these groups may represent even and the other odd numbers. The dial used is moved clockwise to different extents to start the recording of digits 1 through 5 by pulse combinations produced in the return movement, starting with a single positive pulse for the digit 1 and ending for the digit 5 with a combination of five alternating positive and negative pulses beginning with a positive pulse. For the digits 6 through 0, the dial is moved counter-clockwise to produce pulse combinations starting for the digit 6 with a five-pulse combination beginning with a negative pulse and ending for the digit 0 with a single pulse which is negative.

Another object of the invention is to provide a novel and advantageous pulse sending device producing positive and negative pulses. In this pulse sending apparatus, there are two side-by-side rows of keys or finger pulls, the right-hand row of keys corresponding from the bottom to the top to digits 1 through 5 and the left-hand row of keys corresponding from the top to the bottom to digits 6 through 0. The arrangement of keys according to the present invention is much less likely to cause confusion than where the digits are arranged along arcs of a circle and less time is taken in operating the pulser inasmuch as the finger movements are made along a straight line instead of circular arcs.

According to one feature of the invention, there is a uni-directional device, such as a rectifier, for each row of keys, whereas in said co-pending application there is but one rectifier used.

The impulse sender is particularly adapted to facilitate rapid operation thereof.

Other objects, features and advantages will appear upon consideration of the following detailed description and of the drawings, in which Fig. 1 is a side elevation of a sender or subscriber's instrument embodying one form of the invention, certain parts being shown in dotted lines and others in dot-and-dash lines;

Fig. 3 is a side elevation of the apparatus of Fig. 9, viewed from the right and with certain parts broken away;

Fig. 4 is a sectional detail view of a sector for operating the main shaft of one unit of the sender;

Fig. 5 is a section taken on the line 5—5 of Fig. 4;

Fig. 6 is a view of one of the finger-grip or key links;

Fig. 7 is a view similar to Fig. 3 but showing parts which were broken away in Fig. 3;

Fig. 8 is a view illustrating the contact springs of the right hand unit as viewed from above;

Fig. 10 is a diagrammatic view illustrating the manner in which the contact springs of the two units are operated and the circuits controlled thereby;

Fig. 11 is a table illustrating the pulse combinations for the various digits;

Fig. 12 is a view in side elevation, somewhat similar to Fig. 3, but illustrating another form of the invention.

Fig. 13 is a front elevation of the apparatus of Fig. 12 with certain parts broken away.

Fig. 14 is a fragmentary view on a larger scale of certain parts of Fig. 13 with other parts broken away, to illustrate the cooperation of the rectifier contact arms with the commutator;

Fig. 17 is a diagrammatic top plan view of the springs of the right-hand unit, the operating arm or pointer being in home position;

Fig. 18 is a diagrammatic view illustrating the position of the springs when the pointer has been moved to its front position and then returned to a position where it has closed one of the contact sets;

Fig. 19 is a view showing another set of contacts closed and still another opened; and Fig. 20 is a view showing one of the main contacts opened and a further contact closed, prior to release of all springs from control by a pin or pointer.

Figure 1:
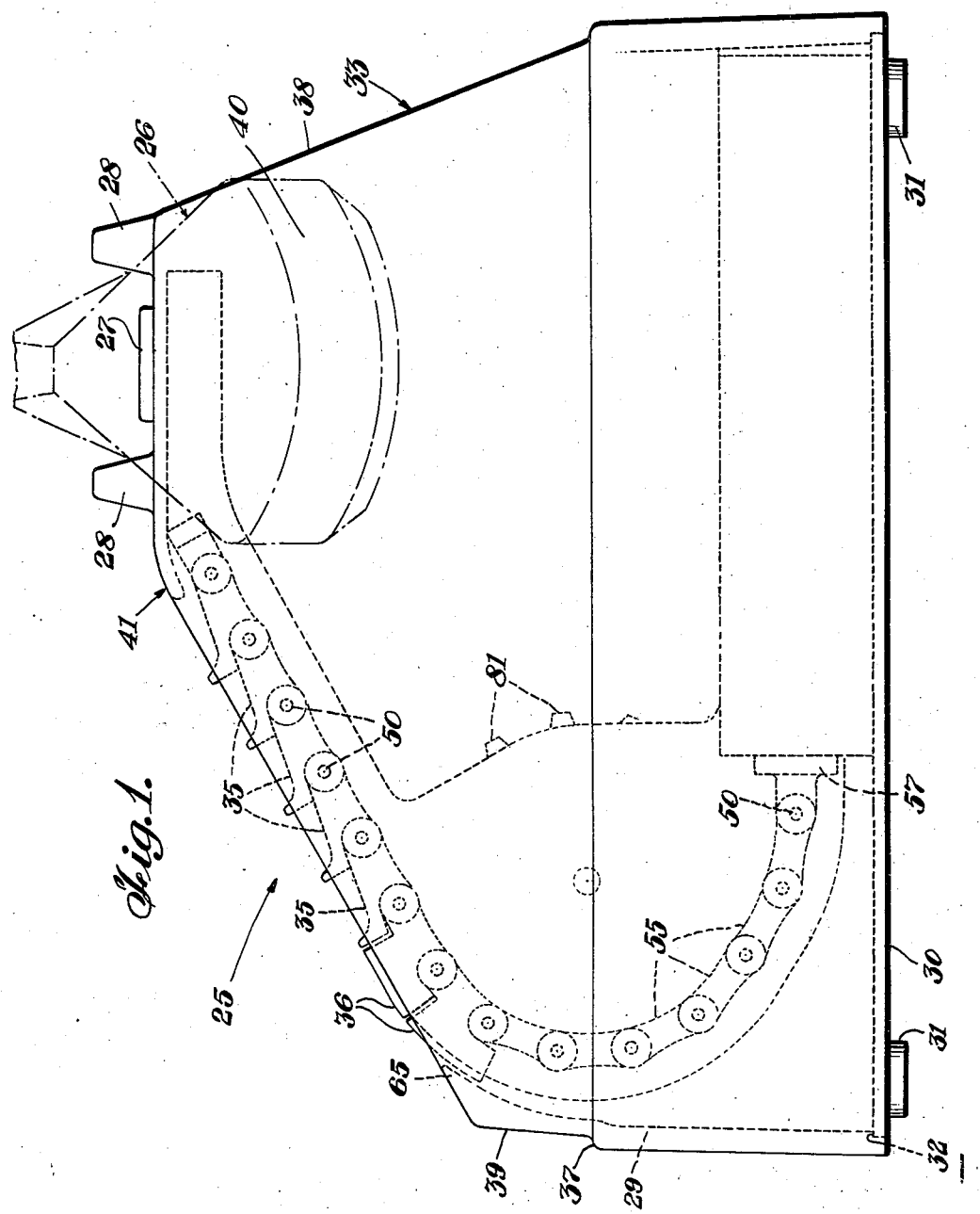
Figure 2:
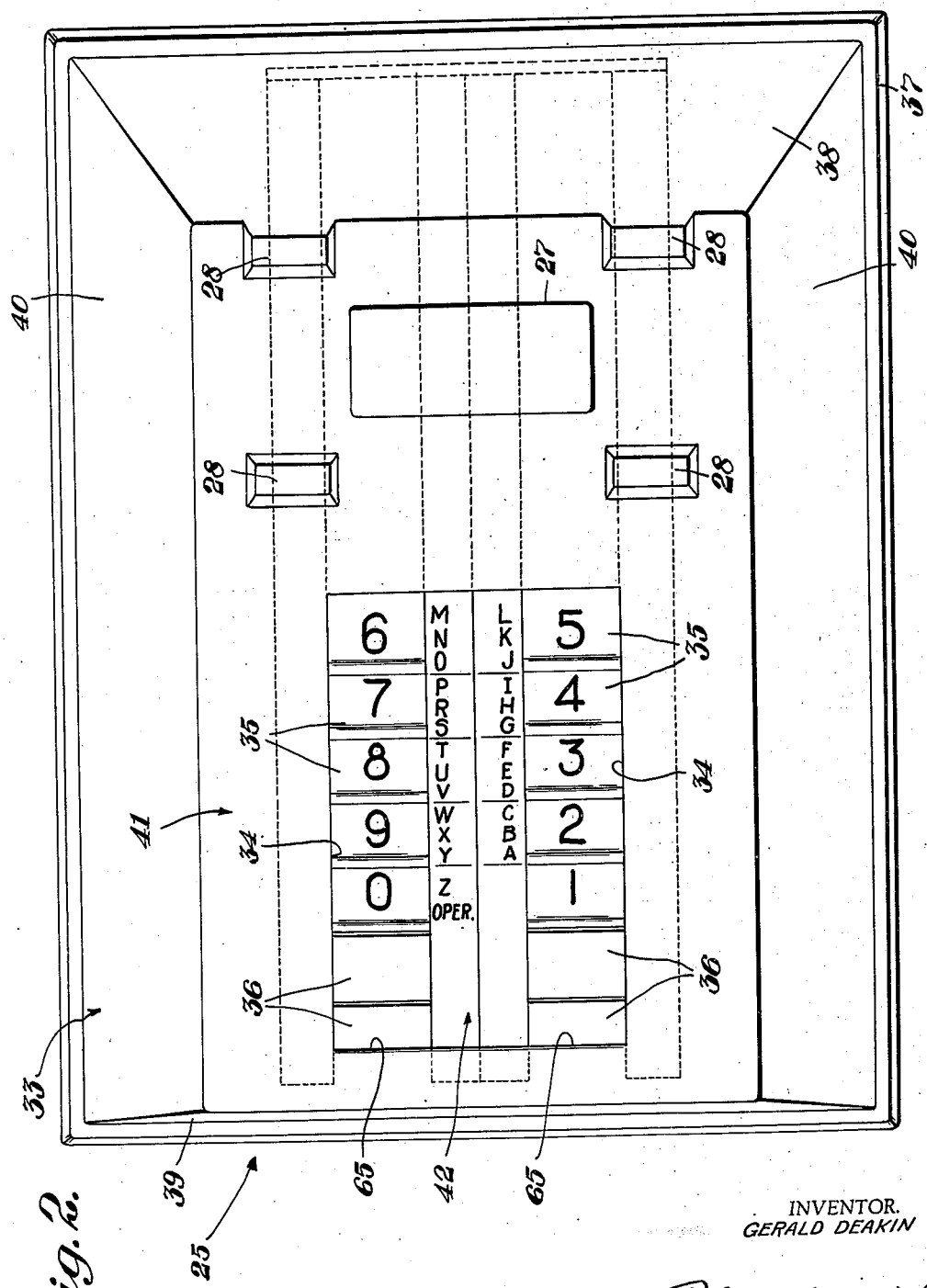
Fig. 2 is a top plan view of the instrument shown in Fig. 1.

Referring to Figs. 1 through 11 of the drawings, a base or stand 25 of a subscriber's set or sender embodying one form of the invention, is illustrated in side elevation in Fig. 1 and in top plan view in Fig. 2. As indicated in Fig. 1 a hand set 26 normally rests on the top 27 of a usual plunger assembly and in a cradle comprising upwardly projecting arms or posts 28.

Said stand 25 includes a frame 29 with a bottom 30 supported by members or feet 31. Said bottom provides a peripheral ledge 32 on which rest recessed lower edges of a cover 33. This cover is preferably integral and open at one point for the plunger of the plunger assembly controlled by said hand set at removal and replacement, and at two parallel slots 34 through each of which is normally displayed a row of five individual finger grip keys 35 and two flush spacers 36 in advance thereof. In connection with starting a call finger grip keys 35 are drawn forward in the proper order.

Said cover 32 includes a rectangular lower part resting on said ledge 32 and extending upwardly to an inturned ledge 37. Above this ledge 37 is an inwardly inclined rear wall 38, a lower front wall 39, inwardly inclined side walls 40 having rear portoins of their upper edges parallel to their lower edges and front portions downwardly inclined to the top of said front wall 39, and a top 41 having a horizontal rear portion carrying said posts 28 of the cradle and a downwardly inclined front portion containing said slots 34 which are separated by a strip 42.

The five finger grip keys 35 in the right hand row, taken in order from front to rear (Fig. 2), bear, respectively the numerals "1," "2," "3," "4" and "5" and in the left hand row, the keys, taken in order from rear to front, bear respectively, the numerals "6," "7," "8," "9" and "0." The strip 42 is divided into two parts which may be separated by a central longitudinal line and these two parts may be separated into compartments corresponding to the home positions of the finger grip keys of the adjacent rows. At the left of the home positions of the "2," "3," "4" and "5" keys are the groups of letters

"A   "D   "G   "J
 B,   E,   H,   K
 C"   F"   I"   L"

respectively. This arrangement of the letters of each group economizes space laterally.

At the right of the left-hand row of keys and opposite the home positions of the keys marked "6," "7," "8," "9" and "0" are the groups "M   "P   "T   "W               "Z
 N,   R,   U,   X,  and   OPER"
 O"   S"   V"   Y"

of which the parts are arranged in order downwardly. The arrangement is in general counterclockwise as for an ordinary dial, but instead of having the numerals on stationary parts with the letters, the numerals are on the movable finger pull keys. With this arrangement of the keys, the greatest movement required for the operating finger may be made substantially half of that required heretofore, and the finger grips move in straight lines instead of arcs.

Said finger grip keys 35 and flush spacers 36 of the right hand set (Fig. 2) are pivotally connected by pins 50 the ends of which are supported in rollers 51 running in grooves 52 in left and right frame members 53 and 54 of a righthand unit 29a of the frame 29. At the front, the grooves 52 curve downwardly and rearwardly in the arc of a circle (Fig. 3) terminating in tangential parts extending to the rear. The finger grip keys 35 and flush spacers 36 form part of a train including also six units 55 which are also connected by pins 50 supported by rollers 51 in the grooves 52. The leading unit 55 is pivotally connected by a pin 50 to a plunger 57 urged forwardly by a helical spring 58 to urge the finger grip keys 35 to their home positions.

The grooves 52 of the frame members 53 and 54 of the right hand unit 29a extend substantially to the rear end of the path of the plunger 57 and the plunger is guided in upper and lower guideways with cylindrical guiding surfaces and separated sufficiently to permit the passage of the edges of units 55 therebetween. As illustrtaed, said upper guideway is provided by members 59 and 60 secured between frame members 53 and 54 by bolts 61 having their heads in countersunk recesses at the left face of members 53 and held in such position by nuts on the other ends of said bolts. Said lower guideway is provided by members 62 and 63 secured between frame members 53 and 54 by means including bolts 64. The rollers 51 on the last pin 50 assist in holding said plunger 57 against tendency to cramp in said guideways. The plunger 57 may have side projections for at least partially closing the openings at the sides between upper members 59 and 60 and lower members 61 and 62. The frame members 53 and 54 and the guide members 59, 60, 62 and 63 form a tubular assembly or tube in which the plunger is reciprocated.

When any finger grip key 35 is pulled the train of keys 35, spacers 36 and units 55, forces plunger 57 back against the action of spring 58 which is supported by a head 64a closing the right hand end (Fig. 3) of the guide for the plunger 57 and spring 58, the movement of the train being stopped by engagement of the operator's finger against a finger stop 65 (Fig. 3) at the forward end of the corresponding slot 34. When the finger is removed from the finger grip key, the train returns to its original position under pressure by spring 58, being stopped by engagement of the rearmost finger grip key with a bumper 66 of suitable material such as rubber. The plunger 57 may serve as a dash pot speed regulator. Preferably, the adjustment is such that when the rearmost finger grip key is pulled to the finger stop and released, the train returns to its original position in about sevenfortieths of a second. This is about the maximum speed and a lower speed is permissible.

Each finger grip key 35 is of suitable material such as metal or plastic and the upper surface of each finger pull or key inclines outwardly from the under surface from rear to front and at the front end turns abruptly outwardly to provide a projection 67 (Fig. 6) which facilitates finger gripping action. At the front end beneath said projection each finger grip key is cut out at each edge to form a central ear 68 with a perforation to receive a pin 50. At the rear end of each finger grip the central part is cut away to provide two ears 69 spaced apart to receive an ear 68 therebetween and with perforations aligned with that in said ear 68. The flush spacers 36 and the units 55 may be connected in the train in the same manner.

Said left frame 53 of the frame unit 29a includes a hub 70 projecting to the right and the right hand frame 54 has a circular opening 71 coaxial with a bore 72 extending through said hub 70 and communicating with a countersunk recess 73 at the left of frame 53. Fixed in said bore 72, is a bearing 74 with its left end flush with the bottom of said recess 73. Rotatably mounted in said bearing 74 is a cylindrical part 74a of a rotatable member or shaft 75 which is held against movement to the right by engagement of the left hand end of said bearing 74 with the head of a screw 76, threaded into an axial bore in the left end of said cylindrical part 74a. As indicated in Fig. 3, the axis of said bearing 74 and shaft 75 is also the axis of said circular arc portions of grooves 52.

Just to the right of the right end of said bearing 74 is a short reduced portion 77 of said shaft providing a shoulder 78. At the right end of said reduced portion 77 is a shoulder 79 provided by further reduction in diameter to portion 80 screw-threaded from said shoulder 79 to its outer end.

Each of said finger grip keys 35 is provided at its inner face with a tapered recess 80a to receive a tapered cog 81 of a plurality carried by a circular-arc flange 82 of a sector 83 having at its central point a perforation 84 to receive said short reduced portion 77 and engage said shoulder 78. Said sector 83 is held against turning on said portion 77 by a flat 85 in the perforation 84 engaging a flat 86 (Fig. 9) on the shaft portion 77. As illustrated there are six cogs 81 and the first flush spacer 36 to the front of the keys is provided with a bottom recess 80a to receive the sixth cog 81.

For mounting on the circular arc flange 82 of the sector 83, each cog 81 may have a reduced portion 87 projecting inwardly through an opening in the flange 82 and provided with a perforation 88 just at the inside of said flange, so that all of said cogs may be locked in position by passing a heavy wire 89 through said perforations and bending the ends of the wire substantially at right angles (Figs. 4 and 5).

Said sector 83 is held in place on the shaft portion 77 by means of a nut 90 (Fig. 9) screwed on the reduced portion 80 of said shaft 75. Outside of said nut 90 is an insulating sleeve 91 on said shaft portion 80 and mounted on this sleeve is a selenium rectifier 92 comprising a disk-like element 93 and rectifier brushes 94 and 95 electrically connected respectively to the left and right faces of said element 93. The insulation of said rectifier element 93 and brushes 94 and 95 also includes washers 96 of insulating material. All of these parts are held in position by means of a long nut 97 having an external flange 98, a short cylindrical portion 99 at the outside of said flange and an externally threaded portion 100.

A sector 101 is loosely mounted on said cylindrical portion 99 of the nut 97 and is held thereon by a nut 102 engaging a shoulder at the right end of portion 99. Outside of said nut 102 is a sector 103 firmly clamped against said nut by means including an outer nut 104. Independent movement of said sector 101 with reference to sector 103 is limited by means of a pin 105 fixed in sector 103 and projecting through a slot 106 in sector 101. Said sectors 101 and 103 are provided respectively with sets of pins 107 and 108 which control certain contacts in a manner and for a purpose to be described hereinafter.

Said rectifier brushes 94 and 95 are preferably of thin spring metal and comprise respectively radial arm portions and flat springs 110 and 111 turned down sidewise and inwardly at right angles to said arms. The radial arm or brush 95 is shorter than that of brush 94 and is displaced angularly to the rear so that part of spring 111 is spaced inwardly from spring 110. At their outer ends these springs are formed with inwardly facing hooks, thus providing outwardly projecting contacts or contact portions 112 and 113 adapted to ride in either direction along a commutator 115 suitably mounted at the inner face of said circular opening 71 in frame 54.

The commutator 115 comprises a left-hand strip 116 and a right-hand strip 117 illustrated diagrammatically in Fig. 10 as straightened and view from above, thus showing the faces opposite to those engaged by the brush springs 110 and 110 respectively. Said left-hand strip 116 has a narrow continuous portion at its left from which project to the right a square tooth 118 at its upper end (Fig. 1), a second square tooth 119 of the same size and spaced therefrom a distance greater than the width of either of these teeth, and at the same distance from the second tooth 119 a third tooth 120 of the same width but of less height than the others.

Said right hand commutator strip 117 comprises a narrow continuous strip at the right and projecting to the left thereof are, starting from the bottom, teeth 125, 126 and 127 corresponding to teeth 118, 119 and 120, except that tooth 127 is shown as somewhat higher than tooth 120. Opposite the tooth 127 is a member 130 and above said tooth 127 is a member 131. Said members 130 and 131 have no electrical connection with the telephone apparatus or with each other but serve as supports for said brush contacts 112 and 113 when the commutator is not in use, thus keeping these contacts clean. Beyond the lower ends of the commutator strips 116 and 117 are corresponding members 132 and 133 which have no electrical connection with the commutator proper.

At the lower and inner faces of the commutator strips 116 and 117 and associated members, the contacts 112 and 113 will move downwardly in correspondence with the movement of a finger grip key 35, and upon release and during return the contacts will retrace their paths to their original or home positions. As illustrated, the commutator strip 116 is directly connected to the "a" wire or line and strip 117 may be connected by suitable means to the "b" line.

The brushes in moving one finger grip space reverse their connections with lines "a" and "b" and due to the rectification of the alternating current supplied for the purpose, produce positive and negative pulses alternately. It will be seen that as the brushes pass from one segment to another, that is when the brushes pass gaps where reversal is effected, there is no loss of time and the momentary short-circuiting at the time of changeover is not harmful to the operation of the circuit.

Mounted on the right side of frame member 54 (Figs. 7, 8 and 9) are six contact springs designated from right to left by reference characters 141, 142, 143, 144, 145 and 146. The rear ends of these springs are separated from each other and from said frame 54 by spacers of insulating material and are secured in position by means of screws 149 which are insulated from said springs. Each of said contact springs is provided at its rear end with a perforated ear 150 (Fig. 7) for attachment to one of various wires or conductors to be referred to hereinafter.

Figure 9:
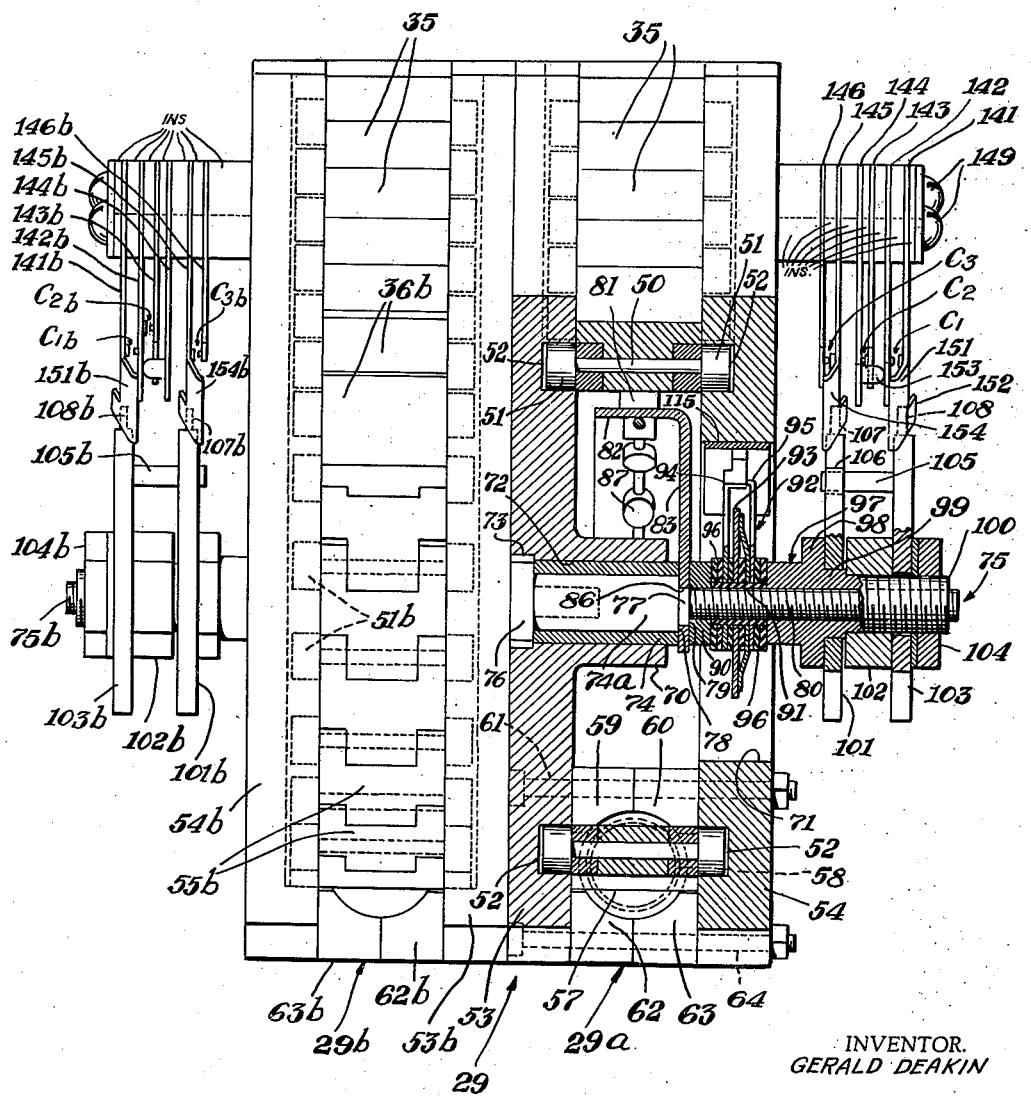
Fig. 9 is a front elevation partly in section and on a larger scale, of the two circuit-controlling units.
Figure 15:
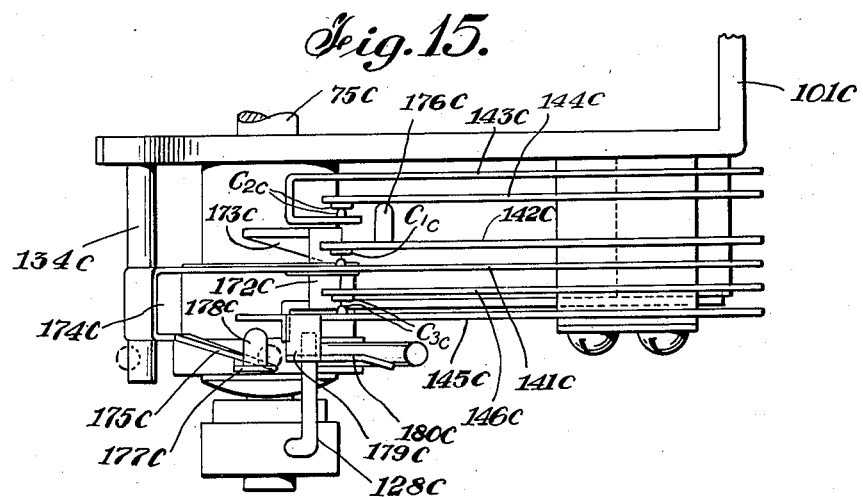
Fig. 15 is a fragmentary top plan view of the contact springs of the right-hand unit and the means for controlling the same.

The spring 141 is provided with an inclined forward end 151 formed by bending the forward end of the spring to the left, thus causing a rearward extension 152 of the lower part of the bent end to project to the right (Figs. 8 and 9).

A forwardly moving pin 108 engaging said inclined end 151 at its rear will move it to the right without closing or opening any circuit. However, in the return movement said pin 108 will engage the forward face of said inclined forward end 151 and move the spring 141 to the left against spring 142 to close contacts $C_1$ and force the same to the left. Such leftward movement of spring 142 will act through an insulating pin or post 153 on spring 144 to separate spring 144 from spring 143 and disconnect contacts $C_2$.

The spring 145 has an inclined forward end 154 corresponding to inclined end 151 of spring 141. A forwardly moving pin 107 engaging inclined end 154 in its forward movement, will merely displace spring 145 to the right and move past the same. On its return movement, however, said pin 107 will engage the front face of said inclined end and move spring 145 against spring 146 to close contacts $C_3$.

The lengths of the inclined ends 151 and 154 are such that the corresponding springs 141 and 145 remain substantially in their operated positions while the finger train is returning, since as one pin drops off the next engages instantly.

The parts of the left hand unit 29b are substantially the same as those of the right hand unit but are arranged in reverse order, that is from right to left instead of from left to right. Also the corresponding parts of the left hand unit are designated by the same numerals as the parts of the right hand unit but with the suffix b applied thereto.

The manner in which the pulses are produced will now be considered in connection with Fig. 10. Lifting of handset 26 from its cradle will cause closing of switches 160 and 161. The closing of switch 161 short circuits the receiver and connects the "a" wire to the "b" wire through an induction coil 162, lead 163, the transmitter switch 161, lead 164, contact spring 143 carrying one of the contacts $C_2$, contact spring 144 carrying the other contact $C_2$, lead 165, spring 143b, contacts $C_{2b}$, contact spring 144b and lead 166 to the "b" wire.

Then upon pulling key "1" forward through two finger grip spaces, the finger of the operator strikes finger stop 65. During this forward movement two pins 108 will wipe past inclined end 151 of spring 141 without closing or opening any circuits. Due to its pin and slot connection with sector 103, sector 101 will be one step behind sector 103 and only one pin 107 will wipe past inclined end 154 of spring 145 during the forward movement of the "1" key.

Upon release of the "1" key, the train will return to its original position. During this movement the two pins 108 in advance of the inclined end 151 will strike it in succession and closely enough together to keep contacts $C_1$ closed and contacts $C_2$ open until both of these pins have passed along said inclined end. Due to the pin and slot connection, sector 101 will again drag behind and the forward pin 107 will not engage inclined end 154 of contact spring 145 until the second and last of the returning pins 108 engages inclined end 151 of spring 141.

During the same period the rectifier brush contacts 112 and 113 are advanced from members 130 and 131 to parts 126 and 118 respectively and then returned. During the forward movements, the rectifier has no current to rectify; and the same is true for the return until it is connected in a circuit. The contacts $C_1$ are closed and the contacts $C_2$ are open during the return movement of the pins 108.

As the trailing pins 108 hold the $C_1$ contacts closed the last pin 107 closes the rectifier circuit and due to the position of the rectifier brush contacts at this time there will be a single positive pulse set up in the line circuit. At this instant, the "a" wire is connected to the "b" wire through the right hand branch of lead 167, left hand strip 116 of the commutator, the rectifier 92, the commutator strip 117, lead 168, lead 169, contacts $C_3$, contact spring 146, lead 165, contacts $C_{2b}$, contact spring 144b, and lead 166. The rectifier brush contacts pass immediately into contact with members 130 and 131 respectively and the rectifier circuit is broken not only at the commutator 115 but at the contacts $C_3$.

At this point it seems to be desirable to point out the rest of the circuit connections in Fig. 10. The spring 141 carrying one of the contacts $C_1$ is connected to one branch of a lead 170 connected in turn to the lead 163 between the transmitter and the receiver switch 160, the other branch being connected to spring 141b of the left hand unit carrying one of the contacts $C_{1b}$. The spring 142 carrying the other contact $C_1$ is connected to one branch of a lead 171 connected to a lead 172 of the receiver circuit just in advance of the receiver, the other branch being connected to the spring 142b carrying the other contact $C_{1b}$.

The spring 142 is connected to the lead 164 and carries one of the contacts $C_2$ which is normally in engagement with the other contact $C_2$ on spring 144 connected to lead 165. At its other end lead 165 is connected to spring 143b and through contacts $C_{2b}$, spring 144b and lead 166 to the "b" wire or line. The spring 146 carrying one of the contacts $C_3$ is also connected to the lead 165. The spring 145 carrying the other contact $C_3$ is connected to a lead 173 which in turn is connected to spring 145b.

During the return movement of the keys 35, the spring 141 is moved to the left with the contacts $C_1$ in engagement thus closing a circuit including the receiver. In this way spring 142 is forced to the left and through said pin 153 will move spring 144 to the left and separate contacts $C_2$, thus breaking the circuit through the "a" wire and the "b" wire. Also, one or more pins 107 will press spring 145 to the left and cause engagement of the contacts $C_3$, thus connecting the rectifier and the commutator across between the "a" line and the "b" line.

Pulling the "2" key to the finger stop 65 will move the brush spring contacts 112 and 113 through three finger grip spaces to the commutator parts 119 and 126 respectively. In the return movement, there will be one idle step before the rectifier circuit is closed at contacts $C_3$ and then there will be a negative pulse followed by a positive pulse. Pulling the "3" key to the finger stop will move the brush springs 112 and 113 to the commutator parts 125 and 119 respectively and on the return movement after release, there will be one idle step followed by pulses in the order plus, minus, plus. For the "4" key, there would be four pulses during its return movement, in the order minus, plus, minus, plus; and for the "5" key the return movement thereof pulses would be produced in the order plus, minus, plus, minus, plus.

Referring to Fig. 2, the five finger grip keys of the left hand row are designated from top to bottom as the "6," "7," "8," "9," and "0" keys respectively; consequently, the "6" key when moved down to the finger stop 65b will pass through six finger grip or key lengths, which is the same as for the "5" key at the right.

This means that there will be five pulses alternating between positive and negative, during the return movement of the "6" key. However, in the left hand commutator, the strip 117b is permanently connected to the "a" wire and the strip 116b is connected to the "b" wire during the return movement of the key. Also the rectifier 92b is arranged to pass current from brush contact 112b to brush contact 113b. Consequently, the first pulse will be negative and the series of pulses will be minus, plus, minus, plus, minus.

For the "7" key the pulsing will be plus, minus, plus, minus, and for the "8," "9," and "0" keys the pulsing will be respectively minus, plus, minus; plus, minus; and minus.

The pulsing thus produced by the keys may be used to control key pulsing relays, digit counting relays, digit storing relays, etc. as disclosed for example in said co-pending application Serial No. 527,921, filed March 24, 1944.

It should be understood that communication or talking is effected by use of direct current but that upon the extension of a line to a distant point at which a selective control is to be exercised, a source of alternating current is coupled to the line thus enabling reversal of polarity in successive pulses. Such an arrangement is referred to in my co-pending application Ser. No. 583,478, filed March 19, 1945, now Patent No. 2,434,910, which states that such an arrangement is provided in my co-pending application, Ser. No. 523,626, filed February 24, 1944, now Patent No. 2,406,001.

Except for the change from positive pulses to negative pulses and vice versa, the pulsing action for the left hand apparatus is controlled in the same general manner as by the right hand apparatus.

In Figs. 12 through 20 there is illustrated another embodiment of the sender of the present invention in which the rectifier and other parts are turned by straight pull action from the keys. The arrangement of fingers grips or keys, so far as appears to the subscriber, is the same in general as for the first form. However, the finger grips of each row are attached to a flexible member such as a cord or belt, or a thin metal band. The finger grip may be of any suitable material interlocked with or attached to a flexible member. For example, the finger grips may be of metal, or of molded rubber or other semihard plastic molded to a tough flexible webbing of cotton or other suitable material.

Referring to Figs. 12 through 16 of the drawings, there is shown a casing or cover 33c. At the front of the casing, there are displayed two downwardly and forwardly inclined parallel rows of finger grip keys 35c of which the keys of the right hand row are shown in Fig. 12, and the keys of the left hand group are shown in Fig. 13. Each row of keys or finger grips 35c is part of a train which includes two flush spacers 36c (Fig. 12).

Said keys 35c and flush spacers 36c of each train may be of molded rubber or other semihard plastic molded to a rough flexible cotton or other suitable textile webbing 50c providing flexible hinge or pivotal connections between said keys and spacers. Above the top key 35c of each train, the webbing 50c is connected to a rim or flange 82c of a pulley 83c urged by a spring 58c to draw the rearmost and uppermost key 35c into engagement with a bumper 66c of suitable material such as rubber. The band 50c might be attached directly to the rim 82c of the pulley 83c but preferably, for economy of space, use is made of a thin metal band 81c connected at one end to the band 50c and at the other end to said rim 82c at a point 56c. The webbing 50c may be made smooth and slippery by waxing or other treatment, and the edges of each band 50c may be guided inside the set by metal U-shape troughs 52c with ample clearance for turns at bends where the bands are turned downwardly and rearwardly. Between the troughs 52, the band 50c may be backed by suitable means which include the surface of the frame or one or more members 54c (Fig. 13) extending across said troughs at the inside thereof.

With the exception of the casing 33c, all of the parts just referred to may be supported on a central frame 29c having a base 30c, an upright 53c and a downwardly and forwardly inclined portion 55c.

The pulley 83c includes not only the rim 82c but also a disk 84c at the outer edge of the rim and secured on shaft 75c. The inner end of said shaft 75c is reduced, thus providing a shoulder 79c which engages the right end of a bearing 74c fixed in a bore in said frame 29c. To the right of said shoulder 79c said shaft 75c has a screw-threaded portion 80c which extends for some distance. On this portion 80c of the shaft and outside of a nut 90c thereon are mounted the rotatable elements of a selenium rectifier 92c and the disk 84c of the pulley 83c.

The rectifier 92c is mounted on an insulating sleeve 91c on said shaft portion 80c and includes a disk-like element 93c and rectifier brushes 94c and 95c electrically connected respectively to the left and right faces thereof. The insulation of said rectifier element 93c and brushes 94c and 95c also includes washers 96c of insulating material. All of these parts are held in position between said nut 90c and a nut 97c. Said rectifier brushes 94c and 95c have bent off spring ends 112c and 113c adapted to cooperate with a commutator 115c arranged in arcuate form on the side of frame 29c and properly insulated. This commutator corresponds to commutator 115 except that it is arranged in an arc on a flat surface.

Outside of said nut 97c and spaced therefrom is a nut 98c which engages the inner surface of the disk 84c of said pulley 83c, the outer face of the disk being engaged by a nut 108c which cooperates with nut 98c to hold the pulley 83c fixed on the shaft 75c. Just to the outside of nut 108c the shaft 75c is again reduced providing a shoulder 99c engaging the end of a bearing 100c fixed in a bracket 101c secured to the frame 29c.

The spring 58c whereby the pulley 83c is returned to home position, comprises coils extending around the shaft 75c and the ends of the spring are connected respectively to the bracket 101c and the nut 108c in such a manner as to urge the nut 108c in a tightening direction. The ends of the spring 58c may be bent at right angles to the adjacent parts of the springs and may be inserted in holes in nut 108c and bracket 101c. For adjustment purposes a plurality of holes (not shown) may be provided to receive the ends of the spring.

Engaging the outer end of said bearing 100c is a hub 102c fixed on said shaft 75c by a set screw 103c and at its inner end provided with a latch-controlling arm 104c. Just outside of hub 102c is a hub 105c which carries a pointer or finger 106c which serves to control the action of a plurality of contact springs 141c, 142c, 143c, 144c, 145c and 146c (Figs. 13 and 17). Said hub 105c is pressed against hub 102c by means of a spring washer 109c compressed against said hub 105c by a nut 110c. Outside of nut 110c is a hub 111c held in position by a set screw 114c. A bent arm 128c extends radially from said hub 111c and then horizontally to the left or inwardly to extend across the path of the pointer 106c.

Figure 16:
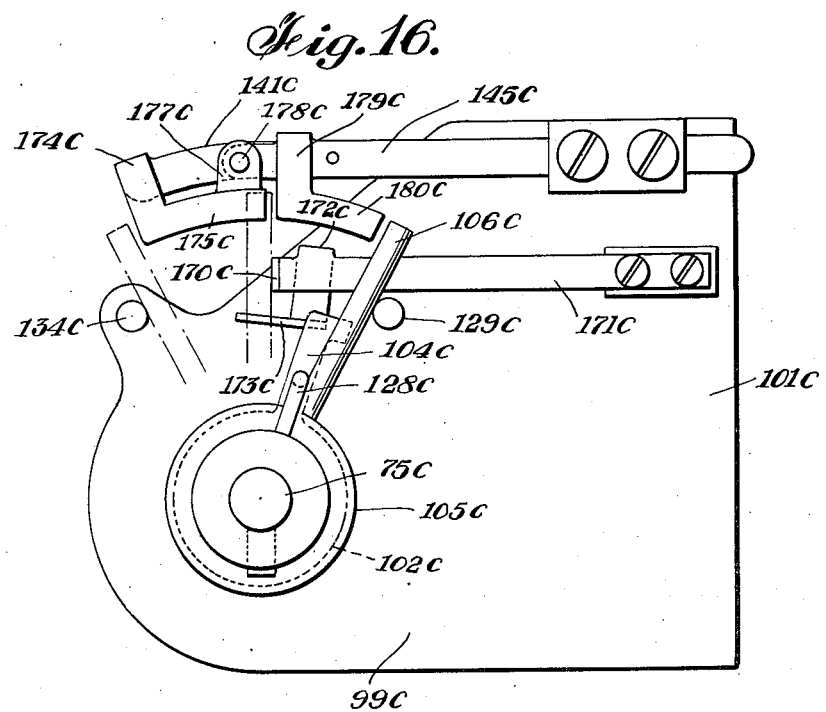
Fig. 16 is a side elevation of the structure shown in Fig. 15.

In home position the pointer 106c rests against a stationary pin 129c projecting from the bracket 101c (Fig. 16). When the shaft 75c is turned counterclockwise by pulling keys 35c the pointer 106c will move with the shaft until it strikes a second stationary pin 134c and is thus held against further forward movement with the shaft which is frictionally connected therewith. When the shaft 75c is turned in the opposite or clockwise direction, the pointer moves rearwardly therewith until it engages a latch or stop 170c. Then the frictional connection with shaft 75c permits the shaft to continue the movement toward its home position although the pointer is held by the latch 170c.

When the latch-controlling arm 104c is returned to a predetermined position, the latch 170c will be released and the pointer will return with the shaft to home position. This movement of the pointer to home position is assured by said bent arm 128c. With the shaft 75c in its home position (Fig. 16), the latch-controlling arm 104c acting through certain elements about to be described, holds said latch 170c out of the path of the pointer 106c to enable the latter to be swung forwardly from its home position.

Said latch 170c is shown as the outturned forward end of a leaf spring 171c of which the rear end is insulated from but supported on the bracket 101c. A bent arm 172c preferably integral with spring 171c, extends upwardly from the upper edge of said spring and to the left (Fig. 13), and then downwardly to a point where a cam 173c projects to the right to cooperate with latch controlling arm 104c. The right hand edge of the cam has an outwardly and rearwardly inclined edge which is the part engaged by said arm 104c.

The spring 141c is controlled by the pointer or finger 106c and to this end is provided with a bent arm 174c of flat material which is integral therewith and extends from the upper edge thereof to the right and then downwardly to the forward end of a flat cam 175c vertically on edge and inclined outwardly to the rear. As viewed in Fig. 16 the cam is arcuate so that the area of contact on pointer 106c will not change. When the pointer or pin 106c is swung forwardly, it engages the left surface of cam 175c and swings it and the forward end of contact spring 141c to the right in an idle movement as the pointer moves past this cam.

On the return movement, however, said pointer upon engaging the right face of cam 175c will swing spring 141c to the left against spring 142c to close contacts C1c, and as the springs 141c and 142c move further to the left, a part or finger 176c of insulating construction mounted on spring 142c will engage spring 143c and separate it from spring 144c, thus separating contacts C2c. About one finger-pull key distance after closing contacts C1c, spring 145c will be moved to the left (Fig. 13) to engage spring 146c, thus closing contacts C3c. This closing of the contacts C3c may be effected by means of a lug 177c projecting upwardly from the rear end of cam 175c and carrying a finger 178c of insulating character which engages spring 145c and causes it to engage spring 146c, thus closing contacts C3c.

When the pointer 106c in its return movement passes off the end of cam 175c, springs 141c, 142c and 143c return to their normal or home positions, and spring 145c is released from control by cam 175a. However, it is necessary to hold spring 145c in engagement with the spring 146c while pointer 106c swings rearwardly to an extent corresponding to a movement through one key space. To obtain this result, spring 145c is provided just to the rear of the rear end of cam 175c, with a bent arm 179c extending from the top edge thereof to the right (Fig. 13) and downwardly to the level of the rear end of cam 175c, where it supports the forward end of cam member or cam 180c which extends rearwardly a distance corresponding to a key space.

The greater part of cam 180c from front to rear is perpendicular to shaft 75c and normally lies in the path of pointer 106c. At its rear end cam 180c has a part 181c inclined outwardly so that the pointer 106c in its forward movement will cam to one side the cam member 180c in an idle movement. As indicated diagrammatically in Figs. 18 and 19, the pointer 106a in its clockwise movement engages the right hand cam 180c as it rides off cam 175c and holds the contacts C3c closed until the pointer passes through another interval corresponding to a single key space.

The operation of the springs 141c, 142c, 143c, 144c, 145c and 146c by the finger 106c is illustrated diagrammatically in Figs. 17, 18, 19, the connection of these springs with leads 164, 165, 170, 171 and 172 of Fig. 10 being shown in Fig. 17.

In Fig. 17, the home position of pointer 106c is shown in a full circle to the right of cam 180c, and the dot-and-dash circle at the left indicates the position of the pointer when stopped in its forward movement by member 134c (Fig. 16).

Fig. 18 illustrates the positions of the parts when the pointer in its return movement has closed the contacts C1c and is about to separate or open contacts C2c.

Fig. 19 illustrates the positions of the parts when the pointer has closed contacts C1c, opened contacts C2c and closed contacts C3c, and is being held by latch 170c.

Fig. 20 illustrates the positions of the parts when the pointer after release from the latch 170c has released the cam 175c but still engages cam 180c. As the pointer moves farther the cam 180c is released and the pointer reaches its home position against member or stop 101c.

With the exception of the left hand row of keys 35c and the associated flush spacers 36c, the parts at the left of Fig. 13 which are arranged in opposite order are given the same numerals as those at the left but the subscript $d$ is used in place of $c$.

The pulsing produced by operating the keys of the second form of the invention is the same as that produced by operating the keys of the first form.

According to the first form of the invention, the plunger 57 (Fig. 3) serves as part of a dash pot speed regulator to prevent too rapid return of the keys to their home positions. According to the second form of the invention, a too rapid return of the keys to their home positions is prevented (Fig. 12) by a braking device comprising a leaf spring 57c of which the rear end is secured to a bracket 182c fixed to the part 55c of the central frame 29c, and the forward end is formed with an upwardly convex portion 181c to engage the lower face of said band 50c. Adjustment of the braking action may be effected by means of a set screw 182c passing through a member 183c fixed on said bracket 182c, and engaging the lower face of said spring 57c.

Although the cam 175c has been disclosed as acting through finger 178c to close contacts C3c, it is obvious that pointer 106c may act independently on spring 145c by replacing cam 180c by one similar to cam 175c placed at a different distance from shaft 75c to prevent interference between the cams.

It will be seen that high speed rectifier pulsing may be attained by use of the disclosed embodiments of the invention.

Each form of the apparatus is made up of a right hand and a left hand unit, both of which can readily be mounted in a central support forming part of the frame. This arrangement provides for economical manufacture since the final assembly on the subscriber's set is limited to mounting two units on opposite sides of a frame, attachment of the finger trains, and adjustment of parts and connections.

It should be understood that various changes may be made, and that certain features may be used without others, without departing from the true scope and spirit of the invention.

What is claimed is:

1. In a circuit controlling device, a signalling circuit, keys corresponding respectively to digits "1" through "9" and "0", arranged in a plurality of rows, means for mounting said keys for movement longitudinally of said rows, a circuit closing device for each row of keys connected to said signalling circuit, and means for each row of keys and controlled by the longitudinal movement of said keys for operating said circuit closing device and co-operating with it so as to permit current to flow in said signalling circuit only in pulses of different combinations of successive different polarities, there being one combination for each key.

2. In a circuit controlling device, the combination, according to claim 1 wherein the keys are finger-grip keys in a plurality of longitudinally movable trains which control the pulse-combination-permitting means, and means is provided for limiting the finger pull movement of each train.

3. In a circuit controlling device, the combination according to claim 1 in which there are two rows of keys, the keys in the first row corresponding to digits "1" through "5" and those of the second row corresponding to digits "6" through "9" and "0."

4. In a circuit controlling device, the combination, according to claim 3, wherein the circuit closing device and the operating means associated with the first row when controlled by the "1" key permits a single pulse of one polarity, when controlled by the "2" through "5" keys permits corresponding combinations of successive pulses of different polarities each ending in a pulse of the same polarity as for the "1" key, and the circuit controlling device and operating means associated with the second row of keys when controlled by the "0" key permits a single pulse of opposite polarity to that of the "1" key and that controlled by the "9" key through "6" permits respectively pulse combinations increasing from "2" to "5" successive pulses of different polarities, each ending in a pulse of the same polarity as for the "0" key.

5. In a circuit controlling device, the combination according to claim 3 wherein there are two trains of five keys each corresponding upwardly in the right train to digits "1" through "5" and downwardly in the left train to digits "6" through "9" and "0" and the pulse combinations permitted by the means variably operated by the keys of the right train run progressively from a single positive pulse for the "1" key up to five alternating-positive-and-negative pulses for the "5" key with the last pulse of each combination positive, and in the left train, the pulse combinations from "6" down to "0" starting with five alternating - positive - and - negative pulses and ending in a single negative pulse with the last pulse of each combination negative.

6. In combination, a signalling circuit, and means connected to said circuit for permitting signals to be sent therethrough comprising a maximum of five alternate positive and negative pulses to a signal and corresponding to digits "1" through "9" and "0," said sending means comprising two side-by-side trains of finger-pull keys, each train comprising rigid key members and corresponding extension members, all of which are rigid and pivotally connected and guided so as to exert thrust action, a rocking member having a part of a cylindrical surface over which the forward part of said train passes and has a driving connection therewith, means for stopping each of said trains when any operating key reaches a certain position, and means for returning said trains to home position.

7. The combination, according to claim 6 wherein the cylindrical surface is provided with projecting cogs spaced to enter corresponding recesses in members of said train.

8. In combination, a signalling circuit, and means connected to said circuit for sending therethrough signals comprising a maximum of five pulses to a signal alternating between positive and negative and corresponding to digits "1" through "9" and "0," said sending means comprising side-by-side trains of finger-grip keys, means for stopping each of said trains when any finger-operated key reaches a certain position, means for returning said trains to home position, devices movable back and forth under control of said trains, dry rectifiers with brushes movable with said trains, commutators over which said brushes move for reversing the connections of said rectifiers in said circuit, and means controlled by said devices for varying connections in said circuit during the return movements of the corresponding trains including connecting into said circuit the rectifiers corresponding respectively to the operated trains.

9. The combination according to claim 8 wherein the means for varying connections includes at each side six leaf springs of which the third and fourth are the only ones normally in contact with each other and the fifth and sixth are in the circuit of the corresponding rectifier, and means operated by the corresponding device to close the contacts between the first and second springs, break the contacts between third and fourth springs, and close the contacts between the fifth and sixth springs.

10. The combination according to claim 8 wherein the means for varying connections includes at each side six leaf springs of which only the third and fourth are normally in contact and the fifth and sixth are in the circuit of the corresponding rectifier, means operated by the corresponding device to effect engagement of the first and second springs and later engagement of the fifth and sixth springs, and an insulating device interposed between one of the first pair of springs and one of the second pair of springs whereby the contacting of the first pair of springs will effect disconnection of the second pair of springs before engagement between the fifth and sixth springs.

11. The combination according to claim 8 wherein the means for varying connections includes at each side six leaf springs of which only the third and fourth are normally in contact and the fifth and sixth are in the corresponding rectifier circuit, an insulating device interposed between one of the first two springs and one of the second pair of springs to disconnect the second pair of springs after connecting the first pair, cam ends on the first spring and one spring of the last pair, a member actuated by the corresponding device and provided with five pins engaging the cam end of the first spring idly in one direction of movement but on the return movement engaging the cam end on the other side and pressing the first spring against the second and then separating the third and fourth springs, these conditions being maintained during the passage of the five pins, a second member carrying five pins acting on the second cam end, and a lost motion connection between the second member and the first member whereby said first member moves through one key space before picking up said second member.

12. In combination, a signalling circuit, a circuit controller comprising variably operable numerical pulse controlling means including two parallel trains of finger-grip keys, and two pivotally mounted rectifiers in said circuit connected respectively to said trains for control thereby.

13. The combination according to claim 12 wherein each of said rectifiers have brushes perpendicular to the pivotal axis thereof and there is a curved commutator for engagement by the outer ends of said brushes.

14. The combination according to claim 12 wherein each of said rectifiers have brushes perpendicular to the pivotal axis thereof and brush tips extending parallel to said axis, and there is a curved commutator in a plane perpendicular to the pivotal axis and said brush tips engage said commutator.

15. In combination, a signalling circuit and a circuit controller comprising two rectifiers with brushes, a two-strip commutator for each rectifier adapted to produce five successive pulses alternating between positive and negative, and means to move the brushes of each rectifier over the corresponding commutator and off the opposite ends thereof, comprising two trains of five finger-grip keys arranged side by side.

16. In combination, a signalling circuit, and means connected to said circuit for sending therethrough signals comprising a maximum of five pulses to a signal alternating between positive and negative and corresponding to digits "1" through "9" and "0," said sending means comprising side-by-side trains of finger-grip keys, means for stopping each of said trains when any finger-operated key reaches a certain position, means for returning said trains to home position, and circuit controlling means operable by said trains including two coaxial devices corresponding to said trains, a flexible element connected to each train, a circular arc rim on each of said coaxial devices and having a driving connection with the corresponding element, a rectifier with brushes carried by each device, a fixed commutator over which said brushes travel back and forth, contact springs to control said circuit, and means including parts on said devices to control said contact springs.

17. The combination according to claim 16 wherein each of said rectifiers is within the corresponding rim and the commutator is in a plane perpendicular to the axis of said devices.

18. The combination according to claim 16 wherein each contact-spring-controlling device comprises a member frictionally connected to the corresponding device for turning therewith and cams connected to certain of said springs for idle movement in one direction and active operation in the other.

19. The combination according to claim 16 wherein each contact spring-controlling device comprises a pointer, and there is a stop to limit its movement away from its home position and enable it to act as soon as the corresponding train starts its return movement.

20. The combination according to claim 16 wherein each group of contact springs includes springs with cams thereon, there is a finger frictionally held on the corresponding device to operate said cams, and there is a latch to stop said finger at a given point in its return movement to maintain the finger in position with the cams in operated positions.

21. The combination according to claim 16 wherein each group of contact springs includes springs with cams thereon, there is a finger frictionally held on the corresponding device to operate said cams, there is a latch to stop said finger at a given point in its return movement to maintain the finger in position with the cams in operated positions, and there is an arm on said device to release said latch.

22. The combination according to claim 16 wherein each group of contact springs includes springs with cams thereon, there is a finger frictionally held on the corresponding device to operate said cams, there is a latch to stop said finger at a given point in its return movement to maintain the finger in position with the cams in operated positions, there is an arm on said device to release said latch, and means effective upon release of said latch for positively returning said finger to its home position.

GERALD DEAKIN.

REFERENCES CITED

The following references are of record in the file of this patent:

UNITED STATES PATENTS

| Number | Name | Date |
|---|---|---|
| 1,251,495 | Forsberg | Jan. 1, 1918 |
| 1,835,256 | Anderson | Dec. 8, 1931 |
| 2,113,611 | Bugge | Apr. 12, 1938 |
| 2,347,108 | Hubbard | Apr. 18, 1944 |
| 2,364,771 | Bascom et al. | Dec. 12, 1944 |
| 2,386,486 | Mallina | Oct. 9, 1945 |
| 2,406,001 | Deakin | Apr. 20, 1946 |